(12) United States Patent
Allen

(10) Patent No.: US 6,983,372 B1
(45) Date of Patent: Jan. 3, 2006

(54) BIOS LOCK CD-ROM ENCODE/DECODE DRIVER

(75) Inventor: Duane Allen, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 1132 days.

(21) Appl. No.: 09/661,540

(22) Filed: Sep. 14, 2000

(51) Int. Cl.
*G06F 12/14* (2006.01)

(52) U.S. Cl. ............................ 713/193; 713/2; 713/190

(58) Field of Classification Search ................ 713/200, 713/2, 168, 190, 193; 380/201; 705/57
See application file for complete search history.

(56) References Cited

U.S. PATENT DOCUMENTS 6,175,925 B1 * 1/2001 Nardone et al. ............ 713/200
6,625,730 B1 * 9/2003 Angelo et al. ................ 713/2

* cited by examiner

*Primary Examiner*—Justin T. Darrow
(74) *Attorney, Agent, or Firm*—Knobbe, Martens, Olson & Bear, LLP

(57) ABSTRACT

Systems and methods for preventing the unauthorized access to data stored on removable media, such as software, include storing a predetermined signature in the area of non-volatile memory in a computer system. Upon initialization of the computer system, a check is made to verify the signature. Only if the signature is verified will decoding software operate.

22 Claims, 5 Drawing Sheets

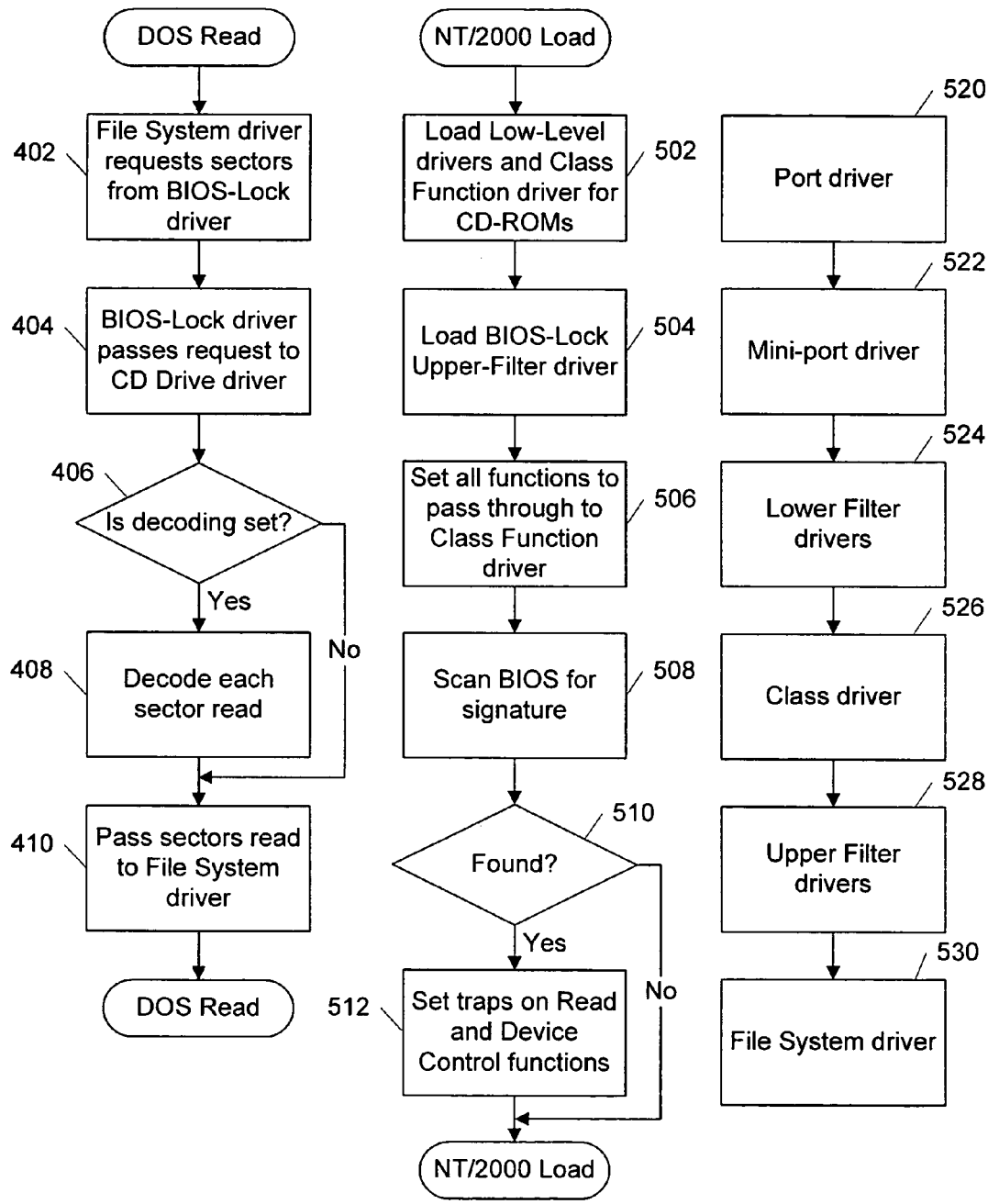
*FIG. 4*   *FIG. 5*   *FIG. 5A*

BIOS LOCK CD-ROM ENCODE/DECODE DRIVER

BACKGROUND OF THE INVENTION

1. Field of the Invention

This invention relates to the field of software security and further relates to systems and methods for restricting any unauthorized use of software.

2. Description of the Related Art

It has become commonplace to sell computers including personal computers (PCs) with software. It has also become commonplace for the software to be provided on removable media such as compact disks (CD-ROM, compact disk-read only memory), zip disks, or floppy disks. The purchaser of the PC then loads the software onto the PC by placing the removable media into an appropriate removable media reader in the PC. The removable media reader then reads the software and the software is transferred to the memory of the PC.

Consumer software is typically licensed for use on a single computer. However, it is difficult to control the use of the software once it is in the possession of the consumer. Therefore, there is a need for systems and methods which prevent the unauthorized access or use of software and data on removable media.

SUMMARY OF THE INVENTION

The present invention provides systems and methods for preventing the unauthorized access to encoded content stored on removable media. Such content includes computer software such as operating systems and application programs.

One aspect of the invention includes a computer system for controlling the unauthorized use of software. The system includes a host processor and a removable media reading device coupled to the host processor. A non-volatile memory is coupled to the host processor and includes a predetermined location for storing a signature. A bootup program is stored in the non-volatile memory and is configured such that upon execution by the host processor, the computer system will only be configured to decode encoded media which is placed in the removable media device if the signature is located in the predetermined location.

Another aspect of the invention includes a method of reading encoded data from a removable media device in a computer system. The method includes initiating a request for data from the removable media reader and determining whether the system is authorized to decode the encoded data. If the system is authorized to decode the encoded data, the method then determines whether the first sector on the removable media is encoded. If the system is authorized to decode encoded data and the first sector on the removable media is encoded, the requested data is decoded.

In a further aspect of the invention, determining whether the system is authorized to decode encoded data includes verifying that a signature is stored in the system in a predetermined memory location.

In another aspect of the invention, a method of preventing unauthorized access to encoded contents stored on removable media by a computer system running an operating system is disclosed. The method includes running a memory-resident program with a lockable decoding function to control the interaction between the operating system and the removable media reader. The method includes scanning the computer system for a predetermined signature and unlocking the lockable decoding function if the signature is found. Removable medium is examined to determine whether it is encoded. If the removable medium is encoded, the lockable decoding function is enabled. Finally, data from the removable medium is decoded if the lockable decoding function is enabled.

In another aspect of the method, the memory resident program is inserted between the operating system and a device driver for the removable media reader.

In a further aspect of the method, the memory resident program adds at least one modular driver between the operating system and the removable media reader.

In a further aspect of the method, the predetermined signature is stored in a basic input output system circuitry of the computer system.

In another aspect of the invention includes a method of preventing unauthorized access to encoded contents stored on removable media by a computer system running an operating system and having a removable media reader. The method includes inserting a driver with a lockable decoding function between the operating system and the device driver for the removable media reader to control the transfer of the information between the operating system and the removable media reader. Further, the method includes scanning the computer system for a predetermined signature and unlocking the lockable decoding function if the signature is found. The method also includes examining a removable medium to determine whether it is encoded and enabling said lockable decoding function if the removable medium is encoded. Finally, data is decoded from the removable medium if the lockable decoding function is enabled.

Another aspect of the invention relates to a method of preventing unauthorized access to encoding content stored on removable media. The method includes adding one modular driver between an operating system and the removable media reader to incorporate a lockable decoding function to control the transfer of information between the operating system and the removable media reader. The method also includes scanning the computer system for a predetermined key and unlocking the lockable decoding function if the signature is found. Next, the method includes examining a removable medium to determine whether it is encoded and enabling the lockable decoding function if the removable medium is encoded. Finally, data from the removable medium is decoded if the lockable decoding function is enabled.

These and other aspects and advantages of the present invention will be come more apparent upon a detailed review of the following detailed description and the accompanying figures.

BRIEF DESCRIPTION OF THE DRAWINGS

The features and advantages of the present invention will become more apparent from the following detailed description of the present invention in conjunction with the drawings in which:

FIG. 4 is a flowchart which represents the process or method of reading removable media according to aspects of the present invention;

FIG. 5 is a flowchart which represents the process or method which occurs upon the loading of a NT/2000-type operating system according to aspects of the present invention;

DETAILED DESCRIPTION OF THE PREFERRED EMBODIMENT

Figure 1:
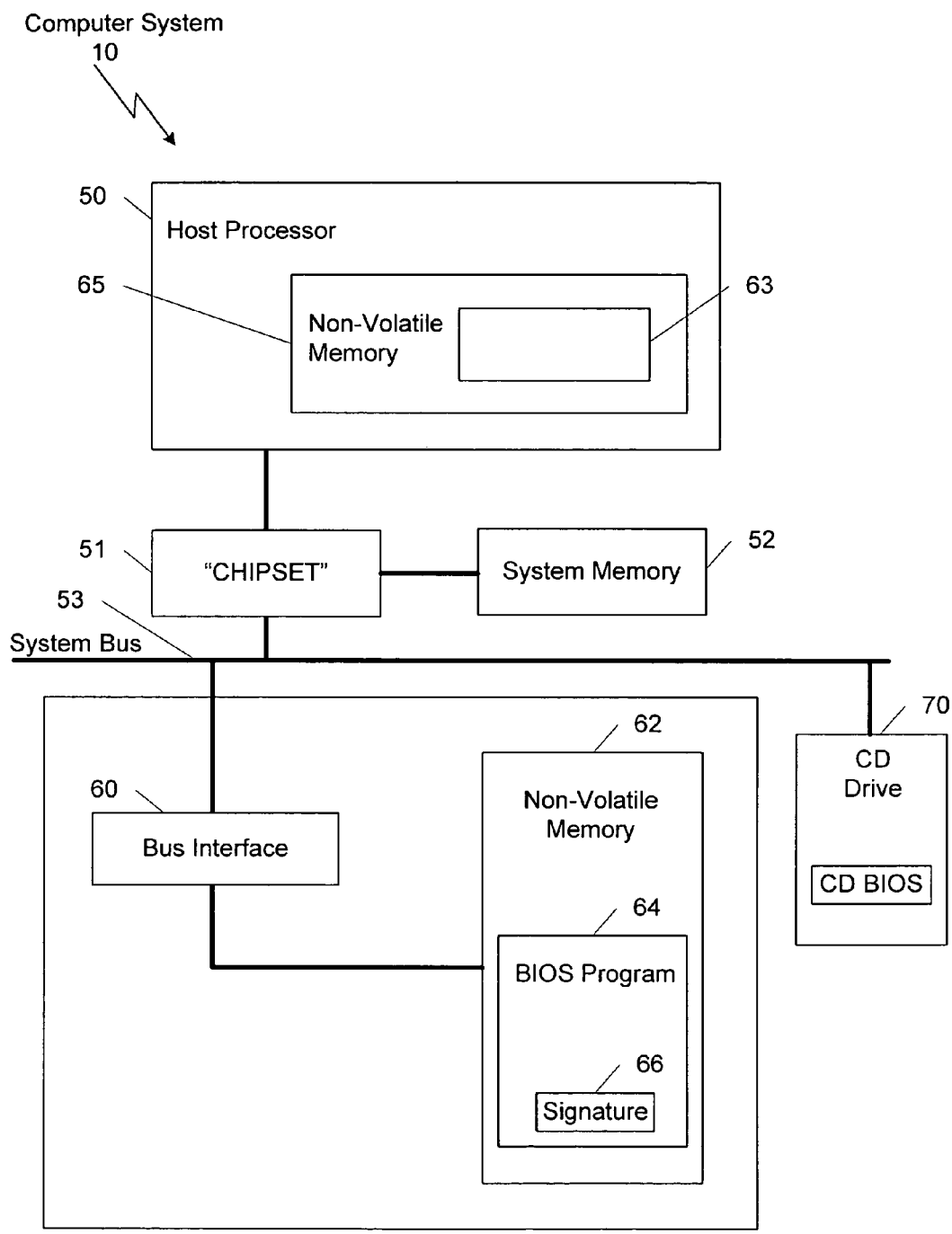
FIG. 1 is a block diagram of functional elements of a computer system, such as a personal computer.

FIG. 1 is a block diagram of an exemplary computer system 10. The computer system can include a chip set 51 which operates as an interface to support communications between a host processor 50, system memory 52, and devices coupled to a system bus 53. The host processor 50 may include logic circuitry as well as an amount of non-volatile memory 65 used to contain key information. System memory 52 may include but is not limited to conventional memory such as various types of random access memory (RAM) and, for example, DRAM, VRAM, SRAM, etc. as well as memory-mapped I/O devices.

System bus 53 may be implemented in compliance with any type of bus architecture including peripheral component interconnect (PCI) and universal serial bus (USB) and the like.

One of the devices that may be coupled to the system bus 53 is a non-volatile memory 62 which interfaces with the system bus 53 via a bus interface 60. Also connected to system bus 53 can be a removable media reading device, such as a CD-ROM drive 70. Contained within a non-volatile memory 62 are the software instructions 63 used by the computer system during the system power-up (boot) sequence.

Also stored within the non-volatile memory 62 (alternatively stored in non- volatile memory 65) is the basic input/output software program (BIOS) 64. According to an aspect of the present invention, a signature or key 66 can also be stored in the non-volatile memory. Alternatively the signature can be stored in the non-volatile memory of the host processor itself on another memory location within the computer system. The signature 66 may be stored in a non-volatile memory location that is accessible by the manufacturer during the final assembly process of the computer system. The signature can be an identifier which identifies a computer system.

Figures 2, 2A, 3:
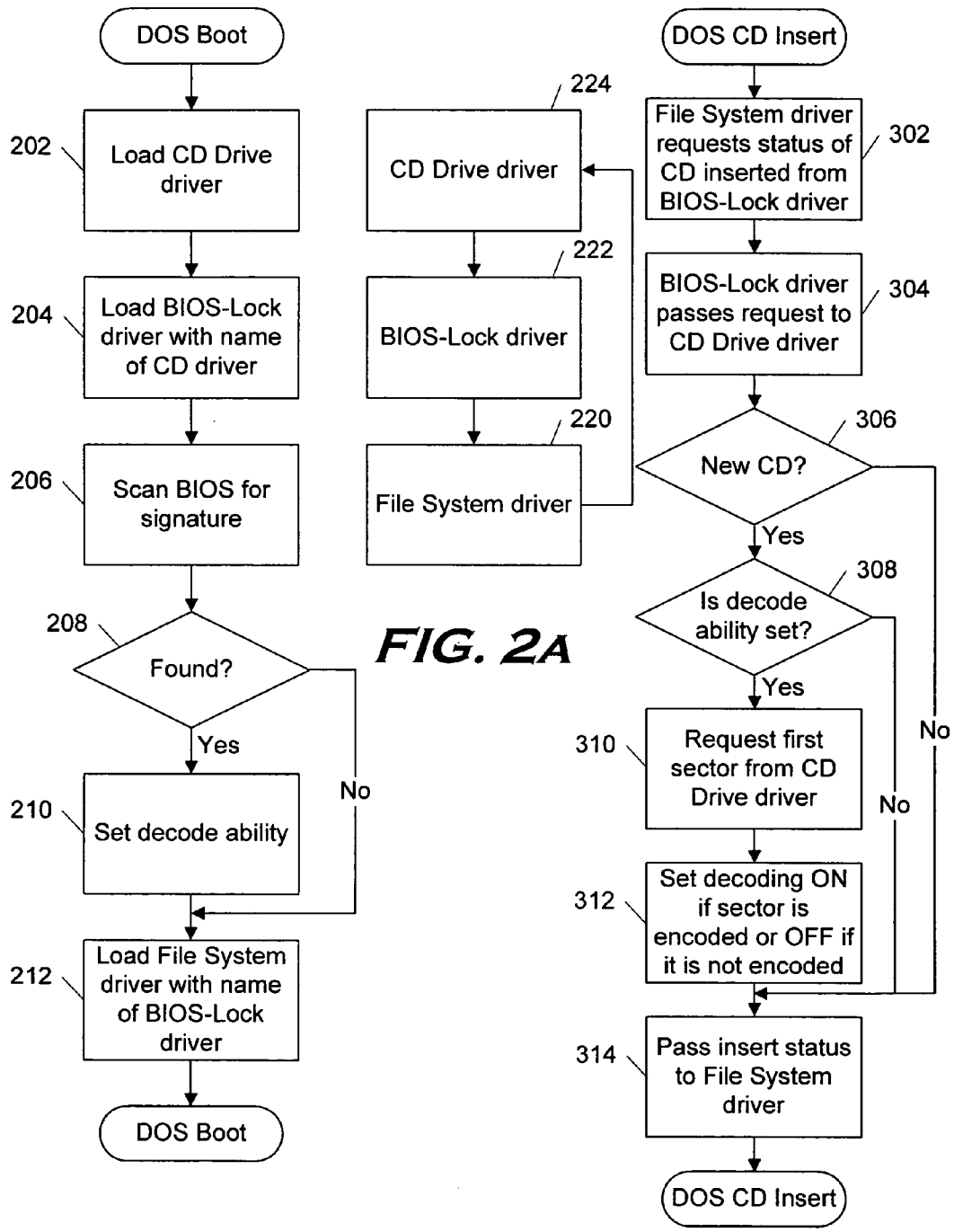
FIG. 2 is a flowchart representing the steps or process of bootup in a DOS system according to aspects of the present invention.
FIG. 2a is a block diagram representing software drivers.
FIG. 3 is a flowchart of the process or method which can be carried out when removable media is first inserted into a reader in a DOS-based system.

Referring to FIG. 2, FIG. 2 is a flowchart which represents steps carried out during the system bootup according to aspects of the present invention as implemented on a FAT (file allocation table) based operating system. These steps can be carried out by the host processor 50 shown in FIG. 1 under the control of memory-resident programs, such as software drivers, which reside in the system memory after being loaded.

As represented by block 202, a software driver for the removable media reader which has a CD drive is loaded into the system memory. A driver is software that enables the operating system to communicate with hardware. Typically the driver is loaded from media such as removable media such as a floppy disk or from fixed media such as a hard disk drive. Next, as represented by block 204, a BIOS lock driver is loaded into the system memory. As represented by the block 206, the BIOS lock driver then causes the system to search for the signature, which can be stored, for example, in the non-volatile memory 62 shown in FIG. 1. As represented by block 208, if the signature is located, the system, as represented by block 210, sets (unlocks) the decode ability of the BIOS lock driver. However, if the signature is not located, the decode ability is not set, thus remaining locked. As represented by block 212, the BIOS system driver is then loaded into the system memory and includes the name of the BIOS lock driver. When software (for example, the file system driver 220 depicted in FIG. 2a and described further below) seeks to or requests to read information from the CD drive, instead of sending that request to the CD driver, that request will be sent to the BIOS lock driver.

FIG. 2a is a block diagram representation of the three drivers discussed in FIG. 2. As represented by FIG. 2a, the process of FIG. 2 installed the file system driver 220 and linked it to the BIOS lock driver 222. The BIOS lock driver is linked to the CD driver 224. Therefore, read requests from the file system driver to the CD drive driver 224 are past through the BIOS lock driver 222.

Referring to FIG. 3, FIG. 3 is a flowchart representing the process or method which occurs when a removable media, such as a compact or CD, is inserted into the removable media reader according to aspects of the present invention.

As represented by block 302, after a CD is inserted into the CD drive (for example CD drive 70 of FIG. 1), the file system driver requests the status of the CD from the BIOS lock driver. As is represented by block 304, the BIOS lock driver passes that request to the CD drive driver. The CD drive can generate a hardware interrupt to flag or notify the computer system that the status of the CD needs to be checked before accessing the CD. The interrupt can be generated because new media has been inserted into the CD drive and could be caused by a number of error conditions.

As represented by block 306, if this is a new CD inserted into the drive, i.e., a CD the status of which has not been already determined, and, as represented by block 308, if the decode ability has been set (see FIG. 2), then, as represented by block 310, the BIOS lock driver requests the first sector of the CD from the CD driver. As represented by block 312, the BIOS lock driver determines whether the first sector from the CD is encoded. The decoding process or algorithm of the BIOS lock driver is then set On (enabled) if the sector is encoded or it is set Off (disabled) if the sector is not encoded. As represented by block 314, the BIOS lock driver then passes the insert status of the CD to the file system driver.

Referring again to block 308, if the decode ability of the BIOS lock driver has not been set (see FIG. 2), the process proceeds from block 308 directly to block 314. Additionally, referring back to block 306, if the CD is not a new CD (i.e., its status has already been determined), the process proceeds directly from block 306 to block 314.

Referring to FIG. 4, FIG. 4 is a flowchart which represents the process associated with the computer system reading the information stored on removable media such as a CD. In order for the computer system 10 to retrieve or read information from the removable media in the removable media reader, such as CD drive 70 of FIG. 1, as represented by block 402, the file system driver requests sectors on the CD from the BIOS lock driver. As represented by block 404, the BIOS lock driver passes the request to the CD drive driver.

As represented by block 406, the BIOS lock driver determines whether the decoding has been set (see block 308 of FIG. 3). If the decoding is set, as represented by block 408, the BIOS lock driver decodes each sector as it is received from the CD drive driver. The sectors are then passed to the file system driver as represented by block 410.

Referring again to block 406, if the decoding is not set, decoding is not performed and the requested sectors are passed to the file system driving without decoding.

We now turn to computer systems, such as system 10 depicted in FIG. 1, operating under control of Windows NT/2000 or similar type operating system (referred to as an NT system). In an NT system, there are generally two ways of interfacing with hardware. The first is referred to as monolithic, which means there is just one driver that handles all of the interaction with a piece of hardware. The second is referred to as modular, which means there can be several levels of drivers which are gone through to the hardware. Taking the CD-ROM as a modular example, and referring to FIG. 5a, the first driver that gets a request for data from the CD is the CD-ROM file system driver 530. This driver knows the format of data files stored on a CD, as opposed to another file system driver that knows the format of audio stored on a CD. The next level can be one or more upper filter drivers 528, that add value to the data coming from the CD-ROM class function driver. The class function driver 526 defines the base functions that are defined for all CD-ROMs such as read sector, play, stop, rewind, check for data corruption etc. The next level can be one or more lower filter drivers 524, that add value to the data coming from the port drivers 520. The port drivers 520 know how to communicate with the different buses such as SCSI, IDE, etc. Attached to the port drivers 520 are mini-port drivers 522 that are designed to handle special functions of a device that the port driver does not implement.

Referring to FIG. 5, FIG. 5 is a flowchart which represents the process or method executed upon bootup of a computer system which is running on an NTFS (NT file system) based operating system according to aspects of the present invention. The process is carried out by the computer system operating under the control of software or firmware, such as a bootup module, as is commonly known in the art.

As represented by block 502, low-level drivers and the class function for driver for CD-ROMS are loaded into the system memory. For example, they can be loaded from removable media or from the hard disk drive.

As represented by block 504, the BIOS lock is then similarly loaded into the system memory. The BIOS lock can be implemented as an upper filter driver (see, FIG. 5a, block 528). As represented by block 506, functions are then all set to pass through to the class function driver. Because there are several function that will not be trapped, initially, all functions are set to pass through the BIOS lock.

As represented by block 508, the system then scans for the signature, such as the signature 66 shown in FIG. 1. This can be accomplished, for example, by reading the contents of a predetermined non-volatile memory address and comparing those contents with information stored on the removable media. As represented by block 510, if the signature is located the process then proceeds to block 512. In block 512, traps on read and device-control functions are then set so that those functions will pass through the BIOS lock upper filter driver. In other words, when those functions are to be used, control is first passed to the BIOS lock upper filter driver. However, if, as represented by block 510, the signature is not found, the traps on the read and control functions are left (as they were set in block 506) to pass through the BIOS lock upper filter driver without modification.

Figure 6:
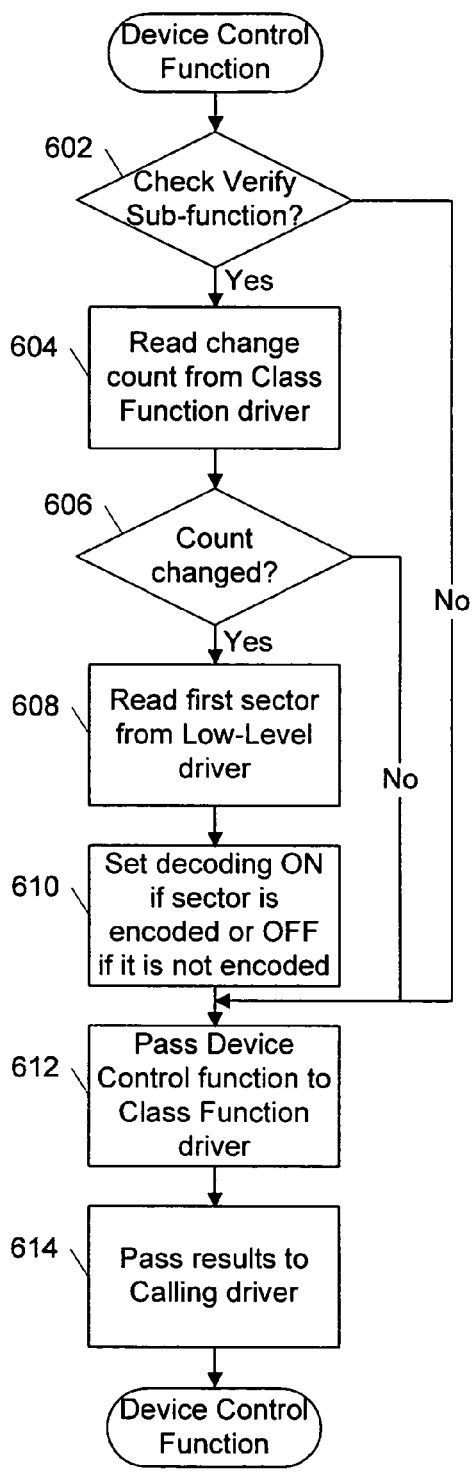
FIG. 6 is a flowchart which represents the process or method for determining whether removable media is encoded according to aspects of the present invention on a NT/2000-type operating system.

Referring to FIG. 6, FIG. 6 is a flowchart which represents the process or method which can be carried out by the BIOS lock upper filter driver to trap the sub function "check verify". This process determines whether a CD is encoded the first time the CD is accessed. The sub function check verify determines, for example, for a CD drive, how many times a CD has been changed since the driver has been started. That information is stored in a memory location referred to as "change count."

As represented by block 602, if the subfunction is verified, as represented by block 604, a change count is read from the class function driver. As represented by block 606, if the count has changed (indicating, for example, in the case of a CD drive, that a new CD has been inserted into the drive), as represented by block 608, the first sector is read from the low-level driver. The BIOS lock upper filter driver then determines whether that first sector is encoded. If that sector is encoded, the BIOS lock upper filter driver sets the decoding to On, or if it is not encoded the decoding is not set to On as represented by block 610.

However, referring back to block 606, if the count has not changed, (indicating, for example, in the case of a CD drive, that a new CD has not been inserted) the process proceeds directly to block 612. Similarly, referring back to block 602, if the device control function that has been requested is not check verify, the process proceeds directly to block 612.

As represented by block 612, device-control function is then passed to the class function driver. The process does not break the flow of data between drivers. It simply turns on or off the decode for the read function. Therefore, device control function is passed on to the class function driver. Next, as represented by block 614, the results are then passed to the calling driver.

Figure 7:
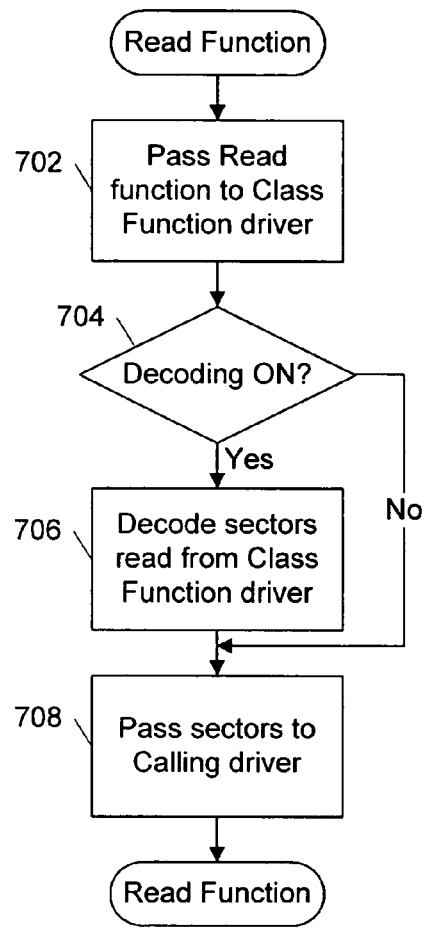
FIG. 7 is a flowchart which represents the process or method for reading removable media according to aspects of the present invention on a NT/2000-type operating system.

Referring now to FIG. 7, FIG. 7 is a flowchart which represents the process or method carried out in a computer operating system, for example, with an NT system, to perform a read function from a removable media device such as a CD drive. As represented by block 702, the read function or read request is passed to the class function driver from a calling driver. As represented by block 704, the BIOS lock upper filter driver determines whether decoding is set On. If the decoding is set On, as represented by block 706, the BIOS lock upper filter driver decodes sectors as they are received from the class function driver. As represented by block 708, those sectors are then passed to the calling driver. However, referring again to block 704, if the decoding is not set On, sectors are passed to the calling driver without being decoded.

Figure 8:
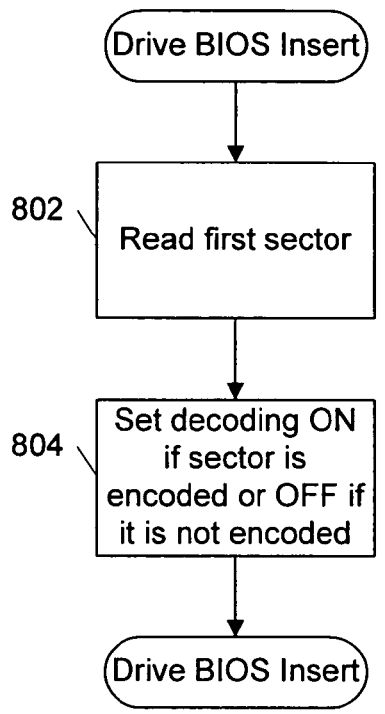
FIG. 8 is a flowchart which represents a process or method of encode detection carried out by a removable media reader.
Figure 9:
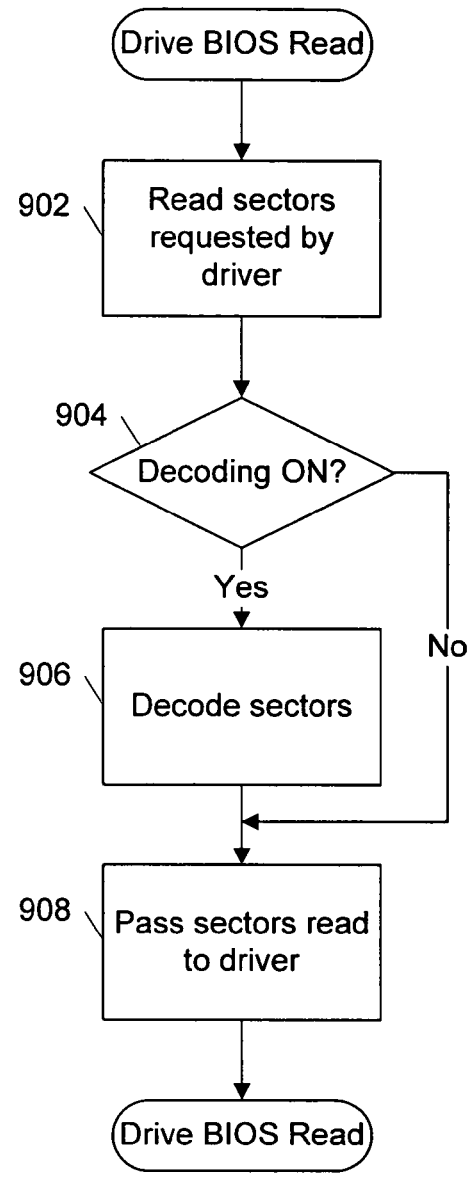
FIG. 9 is a flowchart which represents a process or method of reading and decoding carried out by a removable media reader.

FIGS. 8 and 9 represent processes or methods associated with an aspect of the present invention when the functionality of the detection of encoded data on the removable media, such as represented by blocks 608 and 610 of FIG. 6, and the decoding of such data, such as is represented by blocks 704 and 706 of FIG. 7, are placed within the firmware of the removable media reader such as the BIOS 71 of the CD drive 70 of FIG. 1. The functions represented by FIGS. 8 and 9 can be implemented by the BIOS software or firmware running on the removable media reader. In such a system the BIOS lock upper filter driver would not be needed.

Referring to FIG. 8, as represented by block 802, the CD drive (or other such device) first reads the first sector of data. As represented by block 804, the CD drive sets decoding On or Off based upon its determination of whether the first sector is encoded.

FIG. 9 is a flowchart representing aspects of the read function carried out in the firmware of the CD drive. As represented by block 902, the CD drive first reads the sectors requested by the driver. As represented by block 904, if the decoding is set On, the process then proceeds to block 906. As represented by block 906, the sectors are decoded. As represented by block 908, the sectors are then passed to the CD drive driver (224 of FIG. 2A). Referring back to block 1004, if the decoding is not set On, the process proceeds directly to block 908.

In a system operating as represented by FIGS. 8 and 9, the process depicted in FIG. 8 would take place each time a new CD was inserted into the drive. The CD drive BIOS recognizes when a new CD is inserted. Because the BIOS will only recognize a specific encoding scheme, no signature is needed. (However, a signature could be used to provide additional security.) In other words, a CD that is encoded with a different scheme would not be recognized as encoded by the process of FIG. 8. Therefore, decode would not be set ON. When data was read from the CD in accordance with the process of FIG. 9, it would not be decoded and would be sent in an unrecognizable form to the computer.

While this invention has been described with reference to specific embodiments, this description is not intended to be construed in a limiting sense. Various modifications of the described embodiments, as well as other embodiments of the invention which are apparent to persons skilled in the art, are deemed to lie within the spirit and scope of the invention. For example, though embodiments of the invention have been described with reference to a personal computer, the invention can be implemented in other types of computer systems. Additionally, though the invention has been described with reference to DOS and Windows NT operating systems, it will be apparent to those of ordinary skill in the art that this system can also be readily adapted to other operating systems.

What is claimed is:

1. A computer system for controlling the unauthorized use of software, comprising:
   a host processor;
   a removable media reading device coupled to said host processor;
   a non-volatile memory coupled to said host processor, said non-volatile memory including a predetermined location for storing a signature, wherein the non-volatile memory is located in basic input/output system (BIOS) circuitry of said computer system; and
   a bootup program stored in said non-volatile memory, said bootup program configured such that upon execution by said host processor the computer system will only be configured to decode encoded media in said removable media reading device if said signature is located in said predetermined location.

2. A method of reading encoded data from a removable media device in a computer system, the method comprising:
   initiating a request for data from the removable media reader;
   determining whether the system is authorized to decode encoded data, the determining comprising reading a signature in a non-volatile memory in a basic input/output circuit;
   if the system is authorized to decode encoded data, determining whether the first sector on the removable media is encoded; and
   if the system is authorized to decode encoded data and the first sector on the removable media is encoded, decoding the requested data on the removable media.

3. The method of claim 2, wherein determining whether the system is authorized to decode encoded data includes verifying that a signature is stored in the system in a predetermined memory location.

4. A method of reading encoded data from a removable media device in a computer system, the method comprising:
   initiating a request for data from the removable media reader;
   determining whether the system is authorized to decode encoded data; if the system is authorized to decode encoded data, determining whether the first sector on the removable media is encoded;
   if the system is authorized to decode encoded data and the first sector on the removable media is encoded decoding the requested data on the removable media; and
   if the decode ability is not set, passing data, whether encoded or not, to the system.

5. A method of reading encoded data from a removable media device in a computer system, the method comprising:
   initiating a request for data from the removable media reader;
   determining whether the system is authorized to decode encoded data;
   if the system is authorized to decode encoded data determining whether the first sector on the removable media is encoded;
   if the system is authorized to decode encoded data and the first sector on the removable media is encoded decoding the requested data on the removable media; and
   if the decode ability is set and the decoding is set OFF, passing data to the system from the removable media as it is requested.

6. A method of preventing unauthorized access to encoded content stored on removable media by a computer system running an operating system and having a removable media reader, the method comprising:
   running a memory-resident program with a lockable decoding function to control the interaction between the operating system and the removable media reader;
   scanning the computer system for a predetermined signature and unlocking said lockable decoding function if said signature is found, wherein said predetermined signature is stored in a basic input output system (BIOS) circuitry of said computer system;
   examining a removable medium to determine whether it is encoded and enabling said lockable decoding function if the removable medium is encoded; and
   decoding data from the removable medium if said lockable decoding function is enabled.

7. The method of claim 6, wherein said memory-resident program is inserted between the operating system and a device driver for the removable media reader.

8. The method of claim 6, wherein said predetermined signature is stored in a non-volatile memory of a central processing unit of said computer system.

9. A method of preventing unauthorized access to encoded content stored on removable media by a computer system running an operating system and having a removable media reader, the method comprising:

running a memory-resident program with a lockable decoding function to control the interaction between the operating system and the removable media reader;

scanning the computer system for a predetermined signature and unlocking said lockable decoding function if said signature is found;

examining a removable medium to determine whether it is encoded and enabling said lockable decoding function if the removable medium is encoded; and decoding data from the removable medium if said lockable decoding function is enabled;

wherein said memory-resident program adds at least one modular driver between the operating system and the removable media reader.

10. A method of preventing unauthorized access to encoded content stored on removable media by a computer system running an operating system and having a removable media reader, the method comprising:

inserting a driver with a lockable decoding function between the operating system and the device driver for the removable media reader to control the transfer of information between the operating system and the removable media reader;

scanning the computer system for a predetermined signature, and unlocking said lockable decoding function if said signature is found, wherein said predetermined signature is stored in a basic input/output system (BIOS) circuitry of said computer system;

examining a removable medium to determine whether it is encoded and enabling said lockable decoding function if the removable medium is encoded; and decoding data from the removable medium if said lockable decoding function is enabled.

11. The method of claim 10, wherein said predetermined signature is stored in a non-volatile memory of a central processing unit of said computer system.

12. A method of preventing unauthorized access to encoded content stored on removable media by a computer system running an operating system and having a removable media reader the method comprising:

inserting a driver with a lockable decoding function between the operating system and the device driver for the removable media reader to control the transfer of information between the operating system and the removable media reader;

scanning the computer system for a predetermined signature, and unlocking said lockable decoding function if said signature is found;

examining a removable medium to determine whether it is encoded and enabling said lockable decoding function if the removable medium is encoded; and decoding data from the removable medium if said lockable decoding function is enabled wherein said examination of a removable medium to determine whether it is encoded further comprises: trapping insert status requests of the removable media reader from the operating system to the device driver of said removable media reader.

13. A method of preventing unauthorized access to encoded content stored on removable media by a computer system running an operating system and having a removable media reader, the method comprising:

inserting a driver with a lockable decoding function between the operating system and the device driver for the removable media reader to control the transfer of information between the operating system and the removable media reader;

scanning the computer system for a predetermined signature, and unlocking said lockable decoding function if said signature is found;

examining a removable medium to determine whether it is encoded and enabling said lockable decoding function if the removable medium is encoded; and decoding data from the removable medium if said lockable decoding function is enabled wherein said decoding of data from the removable medium further comprises: trapping read requests from the operating system to the device driver of said removable media reader.

14. A method of preventing unauthorized access to encoded content stored on removable media by a computer system running an operating system and having a removable media reader, the method comprising:

adding at least one modular driver between the operating system and the removable media reader to incorporate a lockable decoding function to control the transfer of information between the operating system and the removable media reader;

scanning the computer system for a predetermined signature and unlocking said lockable decoding function if said signature is found, wherein said predetermined signature is stored in a basic input/output system (BIOS) circuitry of said computer system;

examining a removable medium to determine whether it is encoded and enabling said lockable decoding function if the removable medium is encoded; and decoding data from the removable medium if said lockable decoding function is enabled.

15. The method of claim 14, wherein said predetermined signature is stored in a non-volatile memory of a central processing unit of said computer system.

16. A method of preventing unauthorized access to encoded content stored on removable media by a computer system running an operating system and having a removable media reader, the method comprising:

adding at least one modular driver between the operating system and the removable media reader to incorporate a lockable decoding function to control the transfer of information between the operating system and the removable media reader;

scanning the computer system for a predetermined signature and unlocking said lockable decoding function if said signature is found;

examining a removable medium to determine whether it is encoded and enabling said lockable decoding function if the removable medium is encoded; and decoding data from the removable medium if said lockable decoding function is enabled wherein the lockable decoding function is incorporated by adding an upper filter modular driver with said lockable decoding function.

17. A method of preventing unauthorized access to encoded content stored on removable media by a computer system running an operating system and having a removable media reader, the method comprising:

adding at least one modular driver between the operating system and the removable media reader to incorporate a lockable decoding function to control the transfer of information between the operating system and the removable media reader;

scanning the computer system for a predetermined signature and unlocking said lockable decoding function if said signature is found;

examining a removable medium to determine whether it is encoded and enabling said lockable decoding function if the removable medium is encoded; and decoding data from the removable medium if said lockable decoding function is enabled wherein said examination of a removable medium to determine whether it is encoded further comprises:

trapping insert status requests of the removable media reader from the operating system to the class function driver of said removable media reader.

18. A method of preventing unauthorized access to encoded content stored on removable media by a computer system running an operating system and having a removable media reader, the method comprising:

adding at least one modular driver between the operating system and the removable media reader to incorporate a lockable decoding function to control the transfer of information between the operating system and the removable media reader;

scanning the computer system for a predetermined signature and unlocking said lockable decoding function if said signature is found;

examining a removable medium to determine whether it is encoded and enabling said lockable decoding function if the removable medium is encoded; and decoding data from the removable medium if said lockable decoding function is enabled wherein said decoding of data from the removable medium further comprises:

trapping read requests from the operating system to the class function driver of said removable media reader.

19. A method of preventing unauthorized access to encoded content stored on removable media by a computer system running an operating system and having a removable media reader, the method comprising:

programming the firmware of the removable media reader to incorporate a lockable decoding function to control the transfer of information between the operating system and the removable media reader;

scanning the computer system for a predetermined signature, and unlocking said lockable decoding function if said signature is found, wherein said predetermined signature is stored in a basic input/output system (BIOS) circuitry of said computer system;

examining a removable medium in the removable media reader to determine whether it is encoded, and enabling said lockable decoding function if the removable medium is encoded; and decoding data from the removable medium if said lockable decoding function is enabled.

20. The method of claim 19, wherein said predetermined signature is stored in a non-volatile memory of a central processing unit of said computer system.

21. The method of claim 19, wherein said unlocking and said enabling of said lockable decoding function is performed by a memory-resident program.

22. A computer system for preventing unauthorized access to encoded content stored on removable media, comprising:

a removable media reader; and a host processor running an operating system, said host processor coupled to said removable media reader and configured to control the transfer of information between the operating system and the removable media reader with a lockable decoding function, scan for a predetermined signature and unlock said lockable decoding function if said signature is found, wherein said predetermined signature is stored in a basic input/output system (BIOS) circuitry of said computer system examine a removable medium in said removable media reader to determine whether it is encoded and enable said lockable decoding function if the removable medium is encoded, and decode data from the removable medium if said lockable decoding function is enabled.

* * * * *